May 23, 1961 D. B. DIGEL 2,985,399
SURFACE POSITION INDICATOR WITH FAIL-SAFE MEANS
Filed Oct. 2, 1958

Inventor:
David B. Digel
By: Stephen J. Rudy
Attorney

United States Patent Office 2,985,399
Patented May 23, 1961

2,985,399
SURFACE POSITION INDICATOR WITH
FAIL-SAFE MEANS

David B. Digel, Chicago, Ill., assignor to GPE Controls, Inc., Chicago, Ill., a corporation of Illinois Filed Oct. 2, 1958, Ser. No. 764,931

8 Claims. (Cl. 242—75.53)

This invention relates to a surface position indicator of the non-contacting type wherein a fail-safe means is arranged to prevent engagement of the indicator with the surface being measured upon failure of indicator power supply.

The present invention represents an improvement over a surface position indicator arrangement which employs a regulator utilizing a jet pipe, the principle of which is well known in the control field, which jet pipe is positionally controlled in accordance with the back pressure of a pneumatic sensing nozzle maintained a given distance from the surface being measured. In such an arrangement, failure or severe reduction in pressure of the pneumatic source serving the sensing nozzle, could result in the engagement of the sensing nozzle and the material whose surface is being measured, with possible damage to the nozzle and/or the surface being measured.

The fail-safe means of the present invention automatically eliminates the possibility of engagement of the sensing nozzle with the surface being measured, upon pneumatic pressure failure or pressure reduction below a predetermined value. In such manner, the danger of damage to the sensing nozzle or material whose surface is being measured, is avoided. In addition to providing valuable protective service, the fail-safe means of the invention is simple in structure and arrangement, also extremely reliable in operation.

The main object of this invention is to provide a fail-safe means for a surface position indicator of the non-contacting type.

A more specific object is to provide a fail-safe means which prevents a pneumatic sensing nozzle from engaging a surface being measured, upon failure of pneumatic pressure.

A further object is to provide a fail-safe means for a surface position indicator of the non-contacting type, which is simple in structure and extremely reliable in operation.

Figure 1:
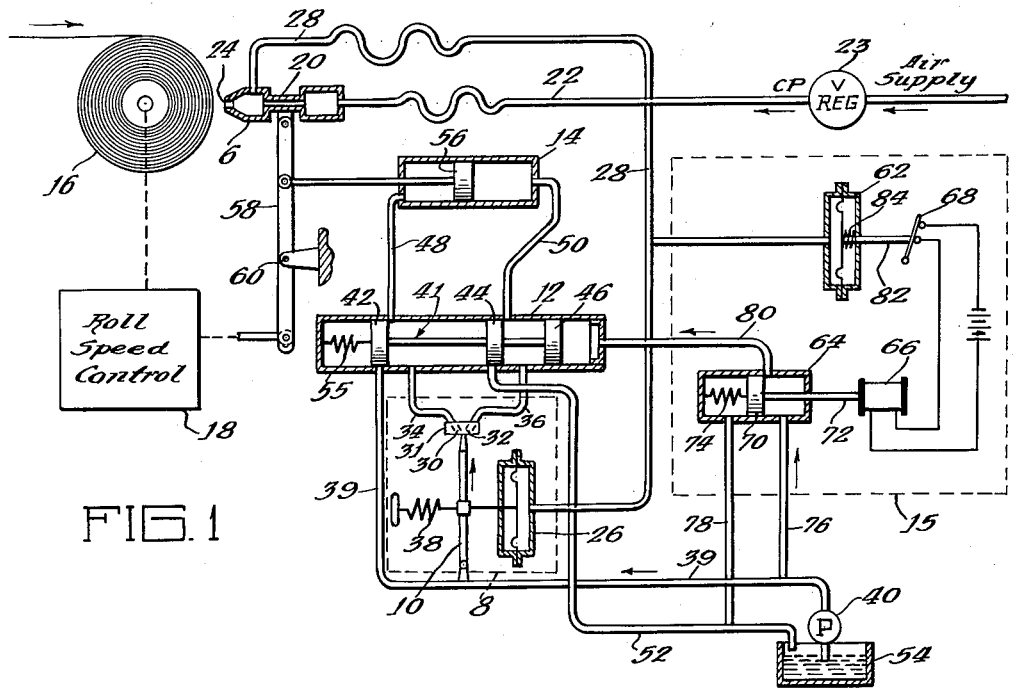
Figure 2:
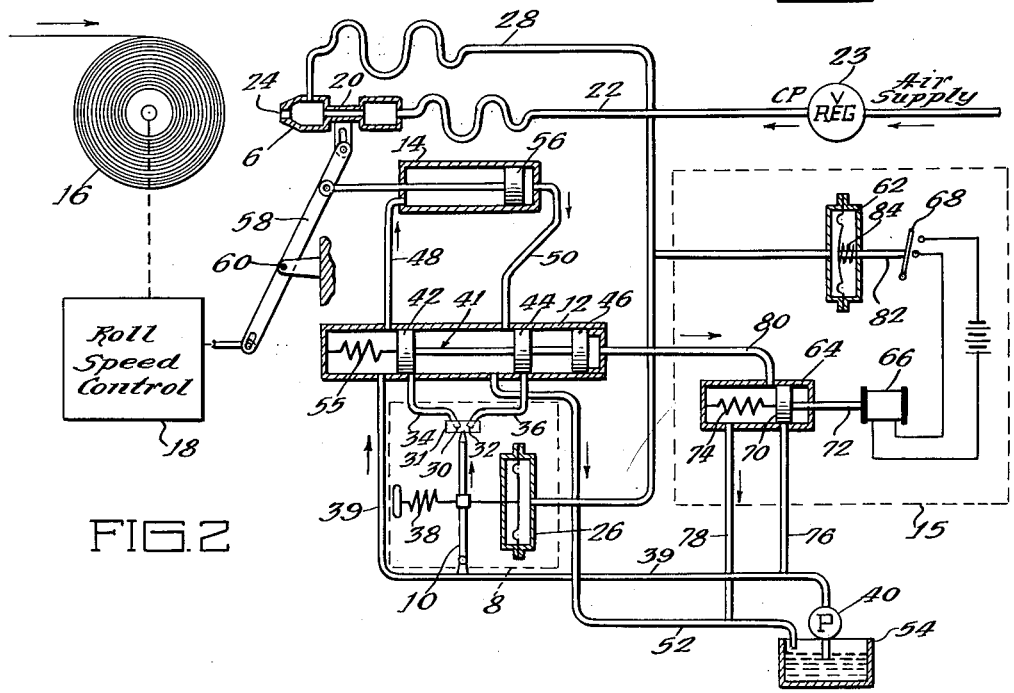

These and further objects and features of the invention will become more apparent from the following description and accompanying drawing wherein:

Fig. 1 is a schematic illustration of a surface position indicator utilizing the fail-safe means of the invention, and showing the position of various components during normal operation; and Fig. 2 is the same, but showing the position of various components upon failure or severe reduction in pressure of the pneumatic source serving the indicator arrangement.

Referring now to the drawing, an improved surface position indicator illustrative of an embodiment of the invention includes, a sensing nozzle 6, a regulator 8 having a jet pipe 10, a distributing cylinder 12, a control cylinder 14, and a fail-safe means 15. The distributing cylinder 12 may be considered as part of the fail-safe means 15. The sensing nozzle 6 functions to measure or sense the diameter change of a spool or roll 16 formed by material being wound, and to send a correction signal to the regulator 8, which will initiate action of a roll speed control 18 to regulate roll speed, for example, for purpose of tension control.

The sensing nozzle 6 is preferably maintained normal to the roll surface at point of sensing, and is adapted to discharge a stream of pressurized fluid, such as air, toward the surface of the roll 16. Adjacent the sensing nozzle is a flow restriction 20 which receives air at constant pressure from a line 22, for discharge into the sensing nozzle 6, from whence it passes through a nozzle orifice 24. A backpressure will be thus developed in the sensing nozzle 6, the magnitude of which is a function of spacing of the nozzle from the surface of the roll 16. Pressure so developed in the nozzle 6, is used as a signal pressure for the regulator 8, which functions to keep the spacing of the nozzle from the roll constant, and simultaneously regulate roll speed control. The line 22 has a valve 23, for pressure regulation.

The regulator 8, which is a specific type of servo mechanism, includes the jet pipe 10 pivoted to swing to positions corresponding to magnitude of signal pressure developed in the nozzle 6, and translated to a force by a diaphragm assembly 26, to which the pressure is transmitted from nozzle 6 by a pipe 28. The free end of the jet pipe 10 is arranged to swing adjacent a receiver 31, having two apertures 30, 32, which are arranged to form the end of pipes 34, 36, respectively, leading to the distributing cylinder 12. A return spring 38 may be regulated to develop a torque which urges the jet pipe for swinging movement toward the diaphragm assembly 26. A pump 40 delivers hydraulic liquid under pressure via a pipe 39 to the jet pipe 10 which jets the liquid toward the apertures 30, 32.

Within the distributing cylinder 12 is slidably arranged a piston 41 having piston heads 42, 44, and 46, which are spaced to provide liquid flow in various paths, or circuits. When the piston is in the Fig. 1 position, liquid in pipe 34 may flow through the cylinder 14 between piston heads 42 and 44, and into a pipe 48, leading to one end of the control cylinder 14, while liquid in pipe 36 may flow through the cylinder 14 between piston heads 44 and 46, and into a pipe 50 leading to the other end of the control cylinder. When the piston is in the Fig. 2 position, liquid flow from pipes 34 and 36 is cut off, while liquid in pipe 39 may flow through the cylinder 12 between piston head 42 and the end of the cylinder into pipe 48, while liquid may flow from pipe 50 through cylinder 12 between piston heads 42 and 44, into a drain pipe 52 leading back to a reservoir 54 from which the pump 40 draws liquid. A spring 55 is arranged at one end in the cylinder 12 to constantly urge the piston 41 toward the opposite end.

The control cylinder 14 includes a piston means 56, one end of which is pivotally connected to a lever 58, whereby movement of the piston means will cause rotary motion of the lever about a fixed pivot 60. The lever 58 is pivotally affixed at the upper end to the nozzle 6, and at the lower end to roll speed control 18. The latter is arranged to regulate roll speed so as to provide uniform winding speed, and for such purpose the roll speed is arranged to function inversely with roll diameter.

The sensing nozzle 6 will be automatically maintained a given distance from the surface of the roll, depending upon the degree of back pressure in the nozzle, which is effective to signal the regulator 8 for operation of the control cylinder 14, to cause positioning movement of the nozzle, and such positioning movement will automatically adjust roll speed in accordance with roll diameter.

To illustrate the manner in which the sensing nozzle 6 is automatically maintained a given distance from the roll surface, it will be seen that increase in roll diameter will reduce the distance between the surface of the roll and the nozzle orifice 24, thus increasing back pressure in the nozzle. Such increase in back pressure will be transmitted to the diaphragm assembly 26, causing counter-clockwise movement of the jet pipe 10. As a result, the liquid pressure in pipe 34, due to the liquid jetted from the jet pipe will increase, while liquid pressure in pipe 36 will decrease. A pressure differential will thus be generated on the piston 56 of the control cylinder 14, due to the liquid flow circuits through the distributing cylinder 12, as above described. The piston 56 will be moved toward the right end of the cylinder, causing the nozzle 6 to be moved away from the surface of the roll 16. As this occurs, the back pressure in the nozzle will decrease and as it attains its preset value, the regulator jet pipe will assume its initial position at some point between the apertures 30 and 32, whereupon movement of the piston 56 will cease.

In the usual arrangement of a surface position indicator along the lines as above described, the pipes 34 and 36 are directly connected to the control cylinder 14, that is, a distributing cylinder 12 is not used. With such an arrangement of the prior art, it will be seen that failure in the pneumatic pressure source would result in drop of pressure in the signal line 28, which would cause the regulator 8 to create a pressure differential on the control cylinder piston 56, resulting in full movement of the piston toward the left end of the cylinder. Such extreme movement would result in the contacting of the nozzle 6 with the roll surface and simultaneously cause increase of roll speed, all to the detriment and possible severe damage to the nozzle and/or material being wound.

The fail-safe means of the present invention avoids such a dangerous condition, or possibility. In a surface position indicator according to the principles of the invention, the distributing cylinder 12 is used in connection with a fail-safe means 15. The latter comprises a diaphragm assembly 62, a holding cylinder means 64, and an electric control circuit including a solenoid 66 and a line switch 68. The cylinder means 64 includes a piston 70, which is connected to an armature 72 of the solenoid 66, and a compression spring 74 arranged to urge the piston in the direction of the solenoid. A pipe, or hose 76 connects the cylinder means 64 with the pressurized liquid line 39 leading from the pump 40, while a pipe or line 78 connects the cylinder means with the liquid drain pipe 52. A pipe or hose 80 connects the cylinder means 64 with the end of the distributing cylinder 12 at the end opposite that in which the spring 55 is arranged. The diaphragm assembly 62 has a shaft or plunger 82 which is affixed to the contacting arm of the line switch 68. A spring 84 is arranged in the diaphragm assembly 62 to urge the arm 82 toward switch opening position. A pipe or hose 86 connects the diaphragm 62 with the signal line 28.

Assume that the surface position indicator is operating normally, as seen in Fig. 1. Under such conditions, the back pressure in nozzle 6 will be at predetermined value, and will be exerted on the diaphragm 26 and also diaphragm 62. The latter will thus be effective to maintain the switch 68 in closed condition thereby causing current flow through solenoid 66, which in energized condition, will maintain the piston 70 of the holding cylinder means 64 in position whereby liquid under pressure will pass from pipe 76 into pipe 80, to maintain the piston 41 in position shown.

Now assume that there should occur a drop of pneumatic pressure to the nozzle 6 due to failure of the pressure source, or a break in the line 22. The back pressure in nozzle 6 would immediately drop and the pressure exerted on diaphragm 62 would be released, resulting in opening of switch 68 due to expansion of spring 84. Solenoid 66 would thus be de-energized and the piston 70 of the holding cylinder 64 would be shifted toward the right due to expansion of spring 74. In the shifted position of piston 70, as seen in Fig. 2, liquid in pipe 80 would be free to flow into pipe 78, thereby releasing pressure on the piston 41, and allowing spring 55 to shift the piston 41 toward the right. In such position of the piston 41, liquid under pressure would flow from pipe 39 into pipe 48, and liquid in pipe 50 would be free to flow into pipe 52. As a result, the piston 56 would be exposed to a pressure differential which would move the piston 56 toward the right causing movement of the nozzle 6 away from the surface of the roll 16, and the simultaneous operation of the roll speed control 18 to effect roll speed slowdown. Such condition would prevail until the pneumatic pressure in pipe 22 was restored to the value necessary to permit normal operation as heretofore described.

In such manner the fail-safe means of the invention will automatically function to prevent the surface position indicator nozzle 6 from engaging the roll surface, upon failure or reduction of pneumatic pressure below a pre-determined amount, and thus protect the nozzle and/or material being wound, or unwound, against damage under such circumstances.

The foregoing description has been given in detail without thought of limitation since the inventive principles involved are capable of assuming other forms without departing from the spirit of the invention or the scope of the following claims.

What is claimed is:

1. In a surface position indicator arrangement including a jet pipe regulator, a sensing nozzle served by a fluid pressure source and adapted to generate a pressure signal for transmission to said regulator which pressure signal is proportional to the back pressure developed in the nozzle due to the proximity of the nozzle to the surface being sensed, and positioning means responsive to normal output action of said regulator to maintain the nozzle a given distance from the surface being sensed in accordance with the magnitude of said pressure signal; a fail-safe means for preventing engagement of said nozzle with the surface being sensed upon reduction of fluid pressure below a given value, said fail-safe means including means responsive to said pressure signal to maintain the regulator in condition for normal output action and to initiate regulator action to actuate the positioning means whereby the nozzle will be moved away from said surface beyond the given distance when the pressure signal falls below a predetermined value.

2. In a surface position indicator arrangement for use with a moving surface including a jet pipe regulator, a sensing nozzle served by a pneumatic pressure source and adapted to generate a pressure signal for transmission to said regulator which pressure signal is proportional to the backpressure developed in the nozzle due to the proximity of the nozzle to the surface being sensed, a speed control means for regulating speed of the surface being sensed, and positioning means responsive to normal output action of said regulator to maintain the nozzle a given distance from the surface being sensed and for the simultaneous operation of the control means in accordance with the magnitude of said pressure signal; a fail-safe means for preventing engagement of said nozzle with the surface being sensed upon reduction of pneumatic pressure below a given value, said fail-safe means including means responsive to said pressure signal to maintain the regulator in condition for normal output action and to initiate regulator action to actuate the positioning means whereby the nozzle will be moved away from said surface beyond the given distance when the pressure signal falls below a predetermined value and whereby the speed control means will simultaneously be operated to reduce the speed of the moving surface.

3. In a surface position indicator arrangement for use with a moving surface which arrangement includes a jet pipe regulator, a sensing nozzle served by a pneumatic pressure source and adapted to generate a pressure signal for transmission to said regulator which pressure signal is proportional to the backpressure developed in the nozzle due to the proximity of the nozzle to the surface being sensed, a speed control means for regulating speed of the surface being sensed, and positioning means responsive to normal output action of said regulator to maintain the nozzle a given distance from the surface being sensed and for simultaneous operation of the control means in accordance with the magnitude of said pressure signal; a fail-safe means for preventing engagement of said nozzle with the surface being sensed upon reduction of pneumatic pressure below a given value and for the simultaneous operation of the speed control means for speed reduction of the moving surface, said fail-safe means including a diaphragm assembly responsive to said pressure signal, a solenoid operatively controlled by said diaphragm assembly, a holding means operatively responsive to said solenoid, and a distributing means interposed between the regulator and the positioning means and adapted to control the response action of the positioning means in accordance with regulator output, said distributing means being operatively responsive to said holding means.

4. A surface position indicator for a moving surface comprising in combination, a jet pipe regulator, means to supply pressure fluid to said regulator, a sensing nozzle served by a pneumatic pressure source and adapted to generate a pressure signal for transmission to said regulator which pressure signal is proportional to the backpressure developed in the nozzle due to the proximity of the nozzle to the surface being sensed, a speed control means for regulating speed of the surface being sensed, a positioning means for maintaining the nozzle a given distance from the surface being sensed and for simultaneously operating the speed control means, a control means for operation of said positioning means, a distributing means interposed between the regulator and the control means, said distributing means being operable in a first position to direct pressure fluid from said regulator to said control means to cause said nozzle to be maintained a given distance from the moving surface and operable in a second position to direct pressure fluid from said regulator to said control means to cause said nozzle to be moved from the moving surface beyond said given distance, and a fail-safe means including means responsive to said pressure signal to hold said distributing means in first position.

5. In a surface position indicator according to claim 4, wherein said distributing valve includes resilient means adapted to shift the distributing valve from first to second position upon discontinuance of holding effort of said fail-safe means.

6. In a surface position indicator according to claim 5, wherein said fail-safe means includes a diaphragm assembly responsive to said pressure signal, a solenoid operatively controlled by said diaphragm assembly, and a holding means responsive to energized condition of said solenoid to direct pressure fluid to said distributing valve and to hold the distributing valve in first position during the time when said solenoid is in energized condition.

7. In a surface position indicator according to claim 6, wherein said diaphragm assembly is responsive to a decrease in said pressure signal below a predetermined amount to cause de-energization of said solenoid.

8. In a surface position indicator according to claim 7, wherein said holding means includes a resilient means effective to recondition the holding means upon de-energization of said solenoid whereby the holding effort upon the distributing valve is terminated.

References Cited in the file of this patent
UNITED STATES PATENTS

| | | |
|---|---|---|
| 2,380,357 | Ziebolz | July 10, 1945 |
| 2,692,581 | Ziebolz | Oct. 26, 1954 |
| 2,735,630 | Ziebolz | Feb. 21, 1956 |